(12) United States Patent
Ambroziak et al.

(10) Patent No.: US 12,022,830 B2
(45) Date of Patent: Jul. 2, 2024

(54) FORMULATIONS OF METAL AND ASCORBIC ACID COMPLEXES, THEIR OBTAINING AND USE

(71) Applicant: INTERMAG SP. Z O.O., Olkusz (PL)

(72) Inventors: Krzysztof Ambroziak, Cracow (PL); Tadeusz Czaja, Ustron (PL); Hubert Kardasz, Olkusz (PL)

(73) Assignee: INTERMAG SP. Z O.O., Olkusz (PL)

( * ) Notice: Subject to any disclaimer, the term of this patent is extended or adjusted under 35 U.S.C. 154(b) by 112 days.

(21) Appl. No.: 16/613,677

(22) PCT Filed: May 15, 2018

(86) PCT No.: PCT/PL2018/050021
§ 371 (c)(1),
(2) Date: Nov. 14, 2019

(87) PCT Pub. No.: WO2018/236235
PCT Pub. Date: Dec. 27, 2018

(65) Prior Publication Data
US 2021/0076681 A1    Mar. 18, 2021

(30) Foreign Application Priority Data

May 15, 2017    (PL) .................................... P.421602

(51) Int. Cl.
| | | |
|---|---|---|
| *A01N 43/08* | (2006.01) |
| *A01N 25/12* | (2006.01) |
| *A01N 59/00* | (2006.01) |
| *A01P 3/00* | (2006.01) |
| *A01P 7/04* | (2006.01) |
| *A01P 21/00* | (2006.01) |

(52) U.S. Cl.
CPC .............. *A01N 43/08* (2013.01); *A01N 25/12* (2013.01); *A01N 59/00* (2013.01); *A01P 3/00* (2021.08); *A01P 7/04* (2021.08); *A01P 21/00* (2021.08)

(58) Field of Classification Search
CPC ........ A01N 43/08; A01N 25/12; A01N 59/00; A01N 59/16; A01N 25/00; A01N 25/02; A01N 63/50; A01N 65/03; A01N 63/22; A01P 7/04; A01P 21/00; A01P 23/00; A01P 3/00; C05D 9/02; C05G 3/60
See application file for complete search history.

(56) References Cited

U.S. PATENT DOCUMENTS

| | | |
|---|---|---|
| 5,186,738 A | 2/1993 | Wendt |
| 6,077,811 A | 6/2000 | Mitchell |
| 2002/0043019 A1 | 4/2002 | Nakashima |
| 2011/0135754 A1 | 6/2011 | Hoberg |

FOREIGN PATENT DOCUMENTS

| | | | |
|---|---|---|---|
| AU | 592211 B2 | 1/1990 | |
| CN | 85107690 A | 4/1987 | |
| CN | 1340482 A | 3/2002 | |
| CN | 101671207 A | 3/2010 | |
| CN | 101838159 A | 9/2010 | |
| CN | 105246328 A | 1/2016 | |
| CN | 110708957 B | 12/2021 | |
| GB | 2090585 A | 7/1982 | |
| HU | 170693 B | 8/1977 | |
| JP | 1982134405 A | 8/1982 | |
| JP | 1987249902 A | 10/1987 | |
| PL | 134889 B1 | 9/1985 | |
| PL | 163688 B1 | 4/1994 | |
| PL | 172871 B1 | 12/1997 | |
| PL | 200702 B1 | 1/2009 | |
| PL | 404894/227766 B1 | 2/2015 | |
| RU | 2764545 C2 | 1/2022 | |
| UA | 125447 C2 | 3/2022 | |
| WO | 9734714 A1 | 9/1997 | |
| WO | WO-2014008472 A2 * | 1/2014 | ............... A01G 7/06 |
| WO | 2015-016724 A1 | 2/2015 | |
| WO | 2016035090 A1 | 3/2016 | |

OTHER PUBLICATIONS

S. Datta, P. Banerjee, R.D. Banerjee, G.M. Sarkar, S.K. Saha, K. Dey, R.K. Maiti, S.K. Sen and J.K. Bhar, "Antimicrobial, insect sterilizing and ovicidal activity of some oxo-vanadium(IV) and oxo-vanadium(V) complexes", Agents and Actions, vol. 12, 4 (1982), 543-551. (Year: 1982).*

C.R. Philips, D.A. Herbert, T.P. Kuhar, D.D. Reisig, W.E. Thomason and S. Malone, "Fifty Years of Cereal Leaf Beetle in the U.S.: An Update on Its Biology, Management, and Current Research", Journal of Integrated Pest Management, 2(2): 2011, 1-5. (Year: 2011).*

Katherine M. Buettner, Joseph M. Collins, and Ann M. Valentine, "Titanium(IV) and Vitamin C: Aqueous Complexes of a Bioactive Form of Ti(IV)", Inorganic Chemistry, 2012, 51, 11030-11039. (Year: 2012).*

T. Peter Amaladhas and S. Sheeba Thavamani, "Synthesis, characterization and catalytic activity of transition metal complexes of ascorbic acid encapsulated in fly ash based zeolite", Advanced Materials Letters, 2013, 4(9), 688-695. (Year: 2013).*

Shiheng Lyu et al: "Titanium as a Beneficial Element for Crop Production", Frontiers in Plant Science, vol. 8, No. 597, (Apr. 25, 2017), pp. 1-19, XP055553707, DOI: 10.3389/fpls.2017.00597.

Imtiaz Muhammad et al: "Vanadium, recent advancements and research prospects: A review", Environment International, vol. 80, (Apr. 19, 2015), pp. 79-88, XP029216406, DOI:10.1016/J.ENVINT. 2015.03.018.

(Continued)

*Primary Examiner* — John Pak
*Assistant Examiner* — Nathan W Schlientz
(74) *Attorney, Agent, or Firm* — Taro Yaguchi

(57) ABSTRACT

The object of the invention is a formulation of metal and ascorbic acid complexes of the general formula $MO(OH)_z(Asc)_x \cdot yH_2O$, in a solid form, where: M is a metal that is titanium or vanadium; Asc represents $C_6H_7O_6$; x is an integer from 1 to 4; y is an integer from 0 to 5; z is 0 or 1; molar ratio of M to Asc is from 1:1 to 1:4, with one or more agriculturally acceptable substances selected from excipients, carriers, other active agents. The object of the invention is also a method for obtaining these formulations and the use thereof. The object of the invention is also the use of the complex as described above, for the preparation of formulations used in the cultivation of plants.

11 Claims, No Drawings

(56) References Cited

OTHER PUBLICATIONS

Yanjun Liu et al: "Ameliorative effect of vanady(IV)-ascorbate complex on high-fat high-sucrose diet-induced hyperglycemia, insulin resistance, and oxidative stress in mice", Journal of Trace Elements in Medicine and Biology, vol. 32, (Aug. 21, 2015), pp. 155-161, XP055553711, DOI:10.1016/j.temb.2015.07.007.
E. G. Ferrer, P. A. M. Williams, E. J. Baran, Verlag der Zeitschrift fur Naturforschung, "Interaction of the Vanadyl (IV) cation with L-ascorbic acid and Related Systems", 1998, 53b, 256.
W. Jabs, W. Gaube, Z. anorg. Allg. Chem., 1984, 514, 179.
International Search Report (PCT/PL2018/050021).
Decision of Patent Grant issued by the Japan Patent Office dated Aug. 9, 2022 for patent application No. JP2019-563805.
Muhammad Imtiaz et al: "Vanadium, recent advancements and research prospects: A review", Environment International, Mar. 29, 2015, pp. 79-88.
Yanjun Liu et al: "Ameliorative effect of vanadyl(IV)-ascorbate complex on high-fat high-sucrose diet-induced hyperglycemia, insulin resistance, and oxidative stress in mice", Journal of Trace Elements in Medicine and Biology, Jul. 9, 2015, pp. 155-161.
Shiheng Lyu et al: "Titanium as a Beneficial Element for Crop Production", Frontiers in Plant Science, Apr. 25, 2017, vol. 8, Article 597, pp. 1-19.

\* cited by examiner

FORMULATIONS OF METAL AND ASCORBIC ACID COMPLEXES, THEIR OBTAINING AND USE

The subject of the invention are formulations of metal and ascorbic acid complexes with a specific structure, their obtaining and use in agriculture.

Metals such as titanium and vanadium are elements necessary for proper growth and functioning of plants. Their high content in soil, however, does not reflect the content in plants because these elements are present in soil in forms completely insoluble in water, and thus inaccessible for plants.

To improve the supply of titanium and/or vanadium in plants, it is necessary to convert them into forms that are water-soluble and easily absorbed by plants.

Metals such as titanium (IV) and vanadium (IV) in the form of complex compounds are well absorbed by plants, and furthermore, in many cases, it was confirmed that they have a beneficial effect on both the growth of plants and the increase of plant resistance to pathogens and stresses, such as drought or low temperatures.

In the art, titanium and vanadium compounds are known, that have found use in intensification of plant life processes. Important compounds of these metals include complexes containing metal-carbon bonds, i.e. titanium- and vanado-organic compounds. Titanium or vanadium administered to plants in this form, accelerate photosynthesis processes. Furthermore, thanks to the increased content of chlorophyll, the yield and quality increase, the resistance of plants to diseases, pests and stresses is also increased.

Patent specification PL 172871 discloses liquid fertiliser containing titanium and micronutritional salts complexed with ascorbic and citric acids in such quantity that in the ready fertiliser the content of individual components in % by weight is 0.05-0.25% of Ti, 0.2-0.4% of the sum of Fe, Mn, Zn, Mo and 0.1-0.9% of B. Ascorbic and citric acids are introduced in a ratio of 1: (0.02-1). The fertiliser is used in foliar feeding and seed treatment.

Chinese patent specification CN 85107690 discloses a solid composition as a plant growth regulator, containing titanium ascorbate, for use in the form of an aqueous solution. It is a reaction product of tetravalent titanium compounds (titanium tetrachloride) with a solution of ascorbic acid in strictly defined ratios of 1 mole of Ti per 0.45 to 1.3 mole of ascorbic acid, and preferably in a ratio of 1 mole of Ti to 0.5 to 0.7 mole of ascorbic acid and with adjusting the final pH in the range of 5-10.8, preferably 6-8. In this process, ammonium hydroxide is used. The reaction product, containing titanium ascorbate (IV), can be separated from the post-reaction sediment and dried to a water-soluble solid form at a temperature of 40-70° C. In the process of purification of synthesised titanium ascorbate (IV), ethanol may be used.

According to Hungarian patent specification HU 170693, a complex compound of titanium, used for the treatment of plants, is prepared by reacting a solution, containing tetravalent titanium ions with ascorbic acid, wherein ascorbic acid is used in 50-200 times excess in relation to the titanium contained in the solution.

From patent specification PL 134889 a plant biostimulating agent is known that in aqueous solution contains 0.5-15% by weight of chelate compound, formed from 14-28 gmoles of ascorbic acid per 1 gatom of titanium, wherein pH of the chelate compound is 5-7, and furthermore contains, with respect to 1 part of titanium, from 0.1 to 2.0 parts of one or more biochemically significant nutrients and/or from 0.0001 to 0.001 parts of one or more phytohormones, and with respect to the total weight of the solid components, contains at least 0.01% by weight of one or more compounds selected from the following group: sorbic acid or a salt thereof, or benzoic acid or a salt thereof, or p-hydroperoxybenzoic acid or a salt thereof, or propionic acid or a salt thereof, or hexamethylenetetramine and optionally contains other excipients. Ascorbic acid is used in 20-200 times excess in relation to the titanium.

A method for obtaining a titanium preparation, especially for agriculture, known from patent specification PL 163688; characterised in that the starting material containing ascorbic acid, is introduced into water at a temperature conveniently below 20° C., whereupon the resulting solution it is separated from the environment most conveniently by adding a small amount of sodium carbonate to the solution, wherein an aqueous solution of titanium salts, most preferably titanyl sulphate, is added to such protected solution in amount up to 5 g Ti/dm$^3$ or above this limit in the finished product, and then a very strong reducing agent, most conveniently in the form of an aqueous solution of titanium trichloride, is directed into the solution, and the entire content of the reactor is mixed for approximately 30 minutes, and finally, the resulting solution is neutralised, most conveniently by directing portions of an aqueous solution of sodium hydroxide, and in the last phase, neutralisation is carried out with an aqueous solution of sodium carbonate, while maintaining the final pH of the preparation preferably within limit about 3.0.

Polish patent application P.404894 discloses a titanium preparation containing complexes of titanium salts with ascorbic and citric acids, a preservative and water-soluble metal sulphates absorbable by plants and optionally additional plant nutrients. The preparation is characterised in that it contains a product of titanium complexation from titanyl sulphate with a mixture of ascorbic acid and citric acid in an aqueous medium, alkalised with magnesium hydroxide in the presence of acetic acid, with a mass ratio of magnesium (calculated as MgO) to titanium of 1:1 to 20:1. The liquid preparation has a pH of 2.5 to 5.5. In a liquid form, the preparation preferably contains from 2 to 25 g of Ti/litre and magnesium up to 170 g of MgO/litre. In turn, the powdery preparation, obtained as a result of drying the liquid form, contains up to 65 g of Ti/kg and magnesium up to 200 g of MgO/kg. A method for preparing a titanium, containing formulation and its use in cultivation as a stimulator of plant development were also described.

Prior art known bioactive titanium (IV) and ascorbic acid complexes used in plant cultivation have been obtained in situ, thus containing a mixture of titanium complexes with various, undefined chemical structures.

Known methods for obtaining preparations of titanium (IV) complexes, applicable in agriculture most often consist in obtaining an aqueous solutions of mixtures of titanium (citrate ascorbate or tartrate) complexes with mixtures of other chemical compounds, mainly of fertilising nature, such as e.g.: sodium, potassium, magnesium, ammonium sulphate, or some amount of impurities from the titanium complexing process. Composition of such mixtures often does not correspond to the current demand of plants, as well as the product obtained not always meets the requirements set for such fertiliser and biostimulation mixtures in terms of stability over time and under extreme temperature conditions during storage, where the effect of gas formation is very often observed, e.g. as a result of product decomposition at temperatures above 35° C., which at high storage temperatures can lead to high pressure inside the package, which can lead to its deformation as well as the occurrence of fluid leaks from the package.

Vanadium compounds for use in the cultivation of plants are also known in the art.

From Polish patent PL 200702, a composition is known which is used for absorption of micronutrients by plants and their pre-development forms, containing vanadium and organic acid (lactic, glycolic, citric) and amino acid (methionine, lysine) among micronutrients. A method was also described for obtaining the composition by dissolving at least one micronutrient and at least one organic acid in a polar solvent, adding hydrogen peroxide, and then adding at least one amino acid.

International patent application WO 16035090 discloses a composition of multifunctional organic agricultural fertiliser and a method for preparing thereof. The composition contains the necessary nutrients for plants, including minerals such as zinc, copper, manganese, iron, boron, silicon, molybdenum, cobalt, vanadium, sulphur, magnesium and calcium in the form of salts or complexes. As chelating agents, organic acids are used, including ascorbic acid.

Document WO 9734714 describes a method for hyperaccumulation of metals in plant shoots. Necessary for plant development metals, among which vanadium is mentioned, are supplied to the soil together with chelating agents (e.g. EDTA, citric acid) and acidifying agents (e.g. nitric, acetic or ascorbic acid).

For the purpose of developing the invention, it has been observed that the use, in the cultivation of plants, of titanium ascorbate (IV) with a specifically defined chemical structure may provide, for certain crops, more preferable results than the use of the same quantity of Ti in the form of titanium preparations being mixtures of titanium ascorbate (IV) complexes of various, undefined structures (Table with results—Example 20). Although liquid mixtures based on titanium ascorbate (IV) complexes obtained by mixing ascorbic acid and titanyl salts in the mentioned ratios are known in the art, it is not possible to accurately determine the quantity of the active ingredient which is titanium ascorbate (IV) during the preparation of such mixtures. This is related to the problem of handling the quantity of active ingredient depending on the use for the cultivation of a particular plant. Furthermore, mixtures with an unidentified quantity of titanium ascorbate (IV) complexes, known in the art, are prepared as liquid formulations because only in such an environment it is possible to react titanium supplied in the form of titanyl salt (IV) with ascorbic acid in order to form the complex which is de facto the active substance. The so obtained liquid formulations, preferably with other additional components such as inorganic salts, metal chelates, organic substances e.g. polyols or other active substances, can be difficult to store and transport. Furthermore, storage of active components in liquid form, leads to an increased risk of uncontrolled reactions between components and hydrolysis processes in such formulation. This may result in formation of compounds that are adverse for plants and the environment, and as a consequence for man, in reduction of activity (efficacy) of the mixture, in formation of compounds that prevent or hinder the storage and transport (e.g. as mention above, formation of gases, leading to an increased pressure in the container in which the liquid mixture is stored and and the consequences of this impeded application. Therefore, there is a need to solve the technical problem of providing solid formulations of titanium complexes with ascorbic acid of a defined structure, a method for obtaining thereof which would provide a specific quantity of complex in the mixture and the use thereof. Providing an invention that meets this demand makes it possible, for the inventors, to develop and optimise preparation of complexes of titanium ascorbate (titanyl ascorbate) in a pure form, which allows the complexes to be subjected to analyses determining the chemical structure, and at the same time in an easy-to-handle form in order to prepare various formulations used for the cultivation of plants for optimisation of dosage of the complex in the cultivation of plants.

Due to the undeniable similarity in chemical properties between the elements of titanium and vanadium, the present invention relates to the formulation of both titanium and vanadium complexes. Both titanium and vanadium are essential elements for the proper functioning of plants, which is confirmed by the aforementioned state of the art. Titanium and vanadium belong to the IV period of the periodic table, are transition metals with a similar electron structure. The person skilled in the art knows the basic chemical reactions that these metals undergo and knows that they form analogous chemical compounds formed by analogous reaction mechanisms. Titanium and vanadium may be present in the same oxidation states and are characterised by the same coordination number in the formation of complexes. The inventors, in parallel to the preparation of titanium complexes, have developed an optimal method for obtaining, purifying and analysing analogous vanadium complexes. The titanium and vanadium complexes with ascorbic acid are known from E. G Ferrer, P A. M. Williams, F. J. Baran, Verlag der Zeitschrift fur Naturforschuna, Interaction of the Vanadyl (IV) cation with L-ascorbic acid and Related Systems, 1998, 53b, 256; W. Jabs, W. Gaube, Z. anorg. Allg. Chem., 1984, 514, 179.

Titanium and vanadium in the oxidation state (IV) form analogous compounds: e.g. oxides, including $Ti_2O$, $V_2O$; salts, including $TiOSO_4$, $VOSO_4$, $TiCl_4$, $VCl_4$.

The object of the invention is a formulation of metal and ascorbic acid complexes of the general formula $MO(OH)_z(Asc)_x.yH_2O$, in a solid form, wherein:

M is a metal that is titanium or vanadium;

Asc is an ascorbate moiety of molecular formula —$C_6H_7O_6$;

x is an integer from 1 to 4;

y is an integer from 0 to 5;

z is 0 or 1;

molar ratio of M to Asc is from 1:1 to 1:4 with one or more agriculturally acceptable substances selected from excipients, carriers, other active agents.

Preferably, the formulation is characterised in that the molar ratio of M to Asc is 1:1, 1:2, 1:3 or 1:4.

Preferably, the metal of the complex in the formulation is titanium. More preferably, the complex has the formula of $TiO(OH)(C_6H_7O_6).1H_2O$, $TiO(C_6H_7O_6)_2.2H_2O$, $TiO(C_6H_7O_6)_3.3H_2O$, $TiO(C_6H_7O_6)_4.5H_2O$.

Preferably, the formulation is characterised in that the metal is vanadium. Preferably, the complex component of the formulation has the formula of $VO(OH)(C_6H_7O_6).1H_2O$, $VO(C_6H_7O_6)_2.2H_2O$, $VO(C_6H_7O_6)_3.3H_2O$, $VO(C_6H_7O_6)_4.5H_2O$.

Preferably, the formulation is characterised in that the complex is present in an amount of 0.01 to 99% by weight of the composition of the formulation.

Preferably, the formulation is characterised in that the excipients are compounds selected from inorganic salts, selected from the group consisting of magnesium sulphate, potassium sulphate, ammonium heptamolibdate; minerals selected from the group consisting of bentonite; chelates selected from metals and other organometallic compounds selected from the group consisting of micronutritional chelates such as Fe EDTA, Zn EDTA, Cu EDTA, Mn EDTA; silicon compounds; organic compounds selected from the group consisting of polyols such as e.g. sorbitol, mannitol, humic and fulvic acids, amino acids such as e.g. glycine, proline, protein hydrolysates, urea, vitamins, plant extracts such as e.g. algae extract, and microorganisms beneficial to plants such as e.g. *Bacillus subtilis*.

The formulation preferably in a solid form is a powder or granules adapted for dissolution in water or solid granules for soil incorporation.

The object of the invention is also a method for obtaining the formulation characterised in that the previously obtained metal and ascorbic acid complex of the general formula $MO(OH)_z(Asc)_x \cdot yH_2O$, wherein:

M is a metal that is titanium or vanadium;
Asc is an ascorbate moiety of molecular formula $-C_6H_7O_6$;
x is an integer from 1 to 4;
y is an integer from 0 to 5;
z is 0 or 1;
molar ratio of M to Asc is from 1:1 to 1:4 is mixed with one or more agriculturally acceptable substances selected from excipients, carriers, other active agents. The excipients may also be substances containing nutritional elements taken up by plants. The excipients may also be carriers.

The object of the invention is also the use of metal and ascorbic acid complexes of the general formula $MO(OH)_z(Asc)_x \cdot yH_2O$, where:

M is a metal that is titanium or vanadium;
Asc an ascorbate moiety of molecular formular $-C_6H_7O_6$;
x is an integer from 1 to 4;
y is an integer from 0 to 5;
z is 0 or 1;
molar ratio of M to Asc is from 1:1 to 1:4, for cultivation of plants.

Preferably, the use is characterised in that the cultivation of plants involves biostimulation of plants and/or reduction of occurrence of plant pests and pathogens.

Preferably, the complexes are used in the cultivation of plants in a pure form or in the form of a mixture with other components. Also preferably, the complexes are used in the form of a liquid product after dissolving with water or of a solid product. More preferably, dissolution of the solid formulation with water takes place immediately before applying it to the plants.

The use is preferably characterised in that pests are selected from the group of: cabbage seed weevil, corn borer moth, cereal leaf beetle.

The use is preferably characterised in that pathogens are selected from the group of: *Alternaria brassicae, Botrytis cinerea,* fusarium foot rot, *Cladosporium herbarum, Septoria nodorum, Gibberella avenacea.*

The use is preferably characterised in that the complexes are administered to the soil, leaves, through fertigation and as an addition to seed dressing.

Preferably, the plants in which the formulation according to the invention is used are plants selected from the group of cereals, vegetables, fruits, ornamental plants, grasses. More preferably, the plants are plants selected from the group of: wheat, rape, lettuce.

Preferably, the use is characterised in that biostimulation consists in increasing the photosynthesis activity, increasing the enzyme activity to stimulate the uptake of nutrients, increasing pollen vitality, activation of pollination and fertilisation processes, increasing the yield and assimilation of micronutrients, increasing the resistance to biotic and abiotic stresses, including stimulation of plants to synthesise more flavonoids.

Preferably, the use is characterised in that the complex is an addition to other mixtures used in the cultivation of plants.

The object of the invention is also the use of metal and ascorbic acid complexes of the general formula $MO(OH)_z(Asc)_x \cdot yH_2O$, wherein:

M is a metal that is titanium or vanadium;
Asc represents $C_6H_7O_6$;
x is an integer from 1 to 4;
y is an integer from 0 to 5;
z is 0 or 1;
molar ratio of M to Asc is from 1:1 to 1:4, for the preparation of formulations described in claim 1 used for the cultivation of plants.

Preferably, the cultivation of plants involves biostimulation of plants and/or reduction of occurrence of plant pests and pathogens.

The pests are selected from the group of: cabbage seed weevil, corn borer moth, cereal leaf beetle.

The use is preferably characterised in that the pathogens are pathogens selected from the group of: *Alternaria brassicae, Botrytis cinerea,* fusarium foot rot, *Cladosporium herbarum, Septoria nodorum, Gibberella avenacea.*

The use is preferably characterised in that the complexes are administered to the soil, leaves, through fertigation and as an addition to seed dressing.

The plants for the cultivation of which the complex is used are selected from the group of cereals, vegetables, fruits, ornamental plants, grasses. More preferably, the plants are selected from the group of: wheat, rape, lettuce.

Preferably, the use is characterised in that biostimulation consists in increasing the photosynthesis activity, increasing the enzyme activity to stimulate the uptake of nutrients, increasing pollen vitality, activation of pollination and fertilisation processes, increasing the yield and assimilation of micronutrients, increasing pollen vitality, activation of pollination and fertilisation processes, increasing the yield and assimilation of micronutrients, increasing the resistance to biotic and abiotic stresses, including stimulation of plants to synthesise more flavonoids.

Preferably, the use is characterised in that the formulation is dissolved in water and used as a liquid formulation.

The terms blend, mixture, composition, formulation are used interchangeably herein.

The method for obtaining titanium or vanadium ascorbate complexes from which the formulations according to the invention are prepared includes the steps of:

a) adding calcium oxide, calcium hydroxide, calcium carbonate or mixtures thereof to an aqueous solution of ascorbic acid, b) adding the compound of formula $MOSO_4$ to the reaction mixture from step a) mixes at a temperature of 40 to 50° C., c) filtering the calcium sulphate precipitate formed as a result of the reaction, d) adding, to the filtrate, a substance that precipitates the remaining amount of sulphate ions, after separation of calcium sulphate, in the form of sparingly soluble salt and filtering thereof, e) adjusting the pH of the obtained filtrate to a value of 2.5-4.8, selected in such a way as to obtain particular complexes characterised by the general formula of $MO(OH)_z(Asc)_x \cdot yH_2O$, where:

M is a metal that is titanium or vanadium;
Asc is $C_6H_7O_6$;
x is an integer from 1 to 4;
y is an integer from 0 to 5;
z is 0 or 1;
molar ratio of M to Asc is from 1:1 to 1:4.

Molar ratio in the range of 1:1 to 1:4 is understood as any ratio within the given range. i.e. the scope of protection includes complexes with a molar ratio of, for example, without limitation: 1:1; 1:2; 1:3; 1:4; 1:1.5,; 1:3.2; 1:3.8 and of any other ratio where the numbers specifying the amounts of M relative to Asc are not limited to integers.

In step a) of this method, calcium ascorbate is obtained as a result of the reaction of ascorbic acid with calcium introduced in the form of oxide, calcium hydroxide, carbonate or mixtures thereof.

In step b) according to the invention, calcium complexed with ascorbic acid is subjected to a double-exchange reaction with a metal introduced into the reaction mixture in the form of titanyl sulphate (for the preparation of titanyl complex) or vanadyl sulphate (for the preparation of vanadyl complex). The amount of calcium introduced into the method in the above-mentioned form depends on the amount of sulphate ions introduced into the reaction, which are derived from titanyl sulphate (for the preparation of titanyl complex) or vanadyl sulphate (for the preparation of vanadyl complex) and optionally from sulphuric acid used in excess to protect $MOSO_4$ sulphate against hydrolysis.

In step c), the sulphur bound in the form of calcium sulphate (gypsum, $CaSO_4.2H_2O$) is removed. Preferably, to reduce the calcium content, present in the form of calcium sulphate, which is a product contamination, the decreasing solubility of calcium sulphate with the increase of temperature is used, by raising the temperature of the reaction mixture before filtration to 65° C. Reduction of calcium content in the actual product can also be achieved by adding ethyl alcohol to the suspension before filtration. Calcium sulphate formed in a highly exothermic process and falling out of the reaction mixture in the form of a precipitate shifts the equilibrium of the reaction towards the formation of metal ascorbate, and an excess of ascorbic acid ensures binding of metal ions, released from the decomposition of titanyl sulphate (for the preparation of titanyl complex) or vanadyl sulphate (for the preparation of vanadyl complex), in the form of metal ascorbate, protecting them from transition into oxides $(MO)_x$ that are not absorbed by plants.

The remaining traces of sulphur, after its earlier analytical determination, are removed from the product in step d) by adding to the solution the barium hydroxide $(Ba(OH)_2)$ remaining after removal of gypsum and dissolved in hot demineralised water (barit water) and by binding of sulphur in the form of sparingly soluble barium sulphate $(BaSO_4)$.

Calcium sulphates, barium sulphate formed in the process are separated from the reaction mixture by sedimentation, followed by filtration, carried out at least several hours after the end of the process, and preferably after 24-36 hours.

Calcium sulphate separated by filtration, being a waste in this method, after adding ingredients such as nitrogen, magnesium and/or other plant nutrients, can be used as a soil fertiliser, mainly as a carrier of calcium and sulphur, necessary for the growth of plants.

In step e), the pH of the reaction mixture is adjusted to a value of 2.5-4.8. For this purpose, ethanolamine is preferably used. It should be emphasised that ethanolamine remains in small amounts in the final product of the method, which is advantageous due to its ability to reduce surface tension, especially in the case of foliar application due to the fact that the resulting drops adhere to the surface of the leaf with a larger surface, which affects the efficiency of uptake of components of the applied solution.

An advantage of the method according to the invention is the lack of impurities in the obtained complex in the form of sodium, potassium, ammonium, magnesium sulphates which are formed in the process of neutralisation of the reaction mixture by known methods and cause thickening of the obtained solution, and thus lowering its stability, which is a disadvantage and drawback of the outlined prior art methods for obtaining mixtures of metal ascorbates.

According to the above method, titanyl and vanadyl complexes are obtained, starting from titanyl sulphate or vanadyl sulphate respectively.

An advantage of the complexes that are obtained by the above method is their high purity and homogeneity in terms of the assumed (defined) formation (structure) and chemical composition, i.e. high content of a metal at a high degree of complexation. The method according to the invention allows for easy designing of the structure of the complex using appropriate proportions of reagents, i.e. using a molar ratio of titanium or vanadium ions to ascorbic acid of 1 to 2, the complexes are obtained, wherein one atom of titanium falls on two molecules of ascorbic acid $Ti(Asc)_2$. The embodiments shown below confirm the above.

Obtained metal ascorbates, are characterised by high stability at low and high temperatures, during use and during storage.

Obtained complexes may be in the form of a solution or (after removal of water) a solid. The solid form for dissolving in water is a more preferable form due to the greater storage capacity as well as product stability during long-term storage at various extreme temperatures and insolation as high temperatures and insolation can cause decomposition of liquid products with the release of $CO_2$.

The complexes according to the invention, can be used to prepare solid (powdery) mixtures and then liquid ones—if it is required by the application—with the intention of being used in the cultivation of plants. Providing these solid formulations, is the main object of the invention.

The following examples, describe embodiments of the methods according to the invention, resulting in obtaining the complexes according to the invention, having specific structures and the use of these complexes in the cultivation of plants. These examples serve to illustrate the invention and are not intended to limit the scope of protection.

M:Asc—represents the molar ratio of metal to the rest of ascorbic acid in the complex.

% m/m—represents weight percentage; each % used in the description, represents weight percentage, unless otherwise indicated.

The term "control" in the embodiments represents a plant not treated with any preparation/formulation.

PREPARATION OF COMPLEXES

EXAMPLE 1

Method for Obtaining Titanyl Ascorbate at a 1:1 Molar Ratio of Ti:Asc 250 litres of water was introduced into a tank equipped with a heater and a stirrer and was heated to the temperature of 50° C., and then 42.2 kg of ascorbic acid was introduced. Once dissolved, ground calcium hydroxide $Ca(OH)_2$ containing 72.0% of calcium oxide (CaO) in the amount of 67.0 kg was dispensed in small portions. The whole was intensively stirred for 40 min., maintaining the temperature at 50° C. 176.0 litres of titanyl sulphate solution containing 11.3 kg of titanium was introduced to the thus obtained mixture with a very thin stream within 50 minutes. The whole was stirred for 90 minutes, and then the resulting calcium sulphate was separated by filtration. 5 l of baritone water was added to the obtained solution of titanyl ascorbate and was stirred for 30 min., and then it was allowed to stand for 24 hours, whereupon the resulting barium sulphate was separated by filtration. The final pH of the solution was adjusted to a value of 4.1-4.3 by addition of ethanolamine. After drying this solution in a spray dryer, a solid product with a content of up to 17.3% m/m of titanium was obtained.

In this example, titanyl ascorbate was obtained, the structure of which is expressed by the general formula $(TiO(OH)(C_6H_7O_6)).1H_2O$, abbreviated as $TiO(OH)(Asc).1H_2O$.

EXAMPLE 2

Method for Obtaining Titanyl Ascorbate at a 1:2 Molar Ratio of Ti:Asc 300 litres of water was introduced into a tank equipped with a heater and a stirrer and was heated to the temperature of 50° C., and then 84.4 kg of ascorbic acid was introduced. Once dissolved, ground calcium hydroxide $Ca(OH)_2$ containing 72.0% of calcium oxide (CaO) in the amount of 67.0 kg was dispensed in small portions. The whole was intensively stirred for 40 min., maintaining the temperature at 50° C. 176.0 litres of titanyl sulphate solution containing 11.3 kg of titanium was introduced to the thus obtained mixture with a very thin stream within 50 minutes. The whole was stirred for 90 minutes, and then the resulting calcium sulphate was separated by filtration. 5 l of baritone water was added to the obtained solution of titanyl ascorbate and was stirred for 30 min., and then it was allowed to stand for 24 hours, whereupon the resulting barium sulphate was separated by filtration. The final pH of the solution was adjusted to a value of 3.2-4.0 by addition of ethanolamine.

Analysis of the solid product after separation of water in the drying process in the spray dryer showed a content of 10.4% Ti m/m.

In this example, titanyl ascorbate was obtained, the structure of which is expressed by the general formula $TiO(C_6H_7O_6)_2.2H_2O$, abbreviated as $TiO(Asc)_2.2H_2O$.

EXAMPLE 3

Method for Obtaining Titanyl Ascorbate at a 1:3 Molar Ratio of Ti:Asc 350 litres of water was introduced into a tank equipped with a heater and a stirrer and was heated to the temperature of 50° C., and then 126.6 kg of ascorbic acid was introduced. Once dissolved, ground calcium hydroxide $Ca(OH)_2$ containing 72.0% of calcium oxide (CaO) in the amount of 67.0 kg was dispensed in small portions. The whole was intensively stirred for 40 min., maintaining the temperature at 50° C. 176.0 litres of titanyl sulphate solution containing 11.3 kg of titanium was introduced to the thus obtained mixture with a very thin stream within 50 minutes. The whole was stirred for 90 minutes, and then the resulting calcium sulphate was separated by filtration. 5 l of baritone water was added to the obtained solution of titanyl ascorbate and was stirred for 30 min., and then it was allowed to stand for 24 hours, whereupon the resulting barium sulphate was separated by filtration. The final pH of the solution was adjusted to a value of 3.0-3.5 by addition of ethanolamine.

The solid product after separation of water in the drying process in the spray dryer contained 7.4% m/m of Ti.

In this example, titanyl ascorbate was obtained, the structure of which it is expressed by the general formula $TiO(C_6H_7O_6)_3.3H_2O$, abbreviated as $TiO(Asc)_3.3H_2O$.

EXAMPLE 4

Method for Obtaining Titanyl Ascorbate at a 1:4 Molar Ratio of Ti:Asc 390 litres of water was introduced into a tank equipped with a heater and a stirrer and was heated to the temperature of 50° C., and then 168.8 kg of ascorbic acid was introduced. Once dissolved, ground calcium hydroxide $Ca(OH)_2$ containing 72.0% of calcium oxide (CaO) in the amount of 67.0 kg was dispensed in small portions. The whole was intensively stirred for 40 min., maintaining the temperature at 50° C. 176.0 litres of titanyl sulphate solution containing 11.3 kg of titanium was introduced to the thus obtained mixture with a very thin stream within 50 minutes. The whole was stirred for 90 minutes, and then the resulting calcium sulphate was separated by filtration. 5 l of baritone water was added to the obtained solution of titanyl ascorbate and was stirred for 30 min., and then it was allowed to stand for 24 hours, whereupon the resulting barium sulphate was separated by filtration. The final pH of the solution was adjusted to a value of 2.8-3.0 by addition of ethanolamine.

The solid product after separation of water in the drying process in the spray dryer contained 5.5% m/m of titanium.

In this example, titanyl ascorbate was obtained, the structure of which is expressed by the general formula $TiO(C_6H_7O_6)_4.5H_2O$, abbreviated as $TiO(Asc)_4.5H_2O$.

Given the complete analogy between the method for obtaining titanium and vanadyl ascorbate complexes with a given molar ratio M:Asc, one selected example of obtaining vanadium complex is indicated for the purposes of this description (Example 5). It is obvious to those skilled in the art that preparation of vanadium complexes encompassed by the invention, takes place analogously to preparation of specific titanium complexes.

EXAMPLE 5

Method for Obtaining Vanadyl Ascorbate at a 1:1 Molar Ratio of V:Asc 250 litres of water was introduced into a tank equipped with a heater and a stirrer and was heated to the temperature of 50° C., and then 176.0 kg of ascorbic acid was introduced. Once dissolved, ground calcium hydroxide $Ca(OH)_2$ containing 72.0% of calcium oxide (CaO) in the amount of 77.0 kg was dispensed in small portions. The whole was intensively stirred for 40 min., maintaining the temperature at 50° C. 276.0 kg of vanadyl sulphate containing 51.1 kg of vanadium was introduced to the thus obtained mixture in small portions within 50 minutes. The whole was stirred for 90 minutes, and then the resulting calcium sulphate was separated by filtration. 5 l of baritone water was added to the obtained solution of vanadyl ascorbate and was stirred for 30 min., and then it was allowed to stand for 24 hours, whereupon the resulting barium sulphate was separated by filtration. The final pH of the solution was adjusted to a value of 3.0-3.4 by addition of ethanolamine.

In this example, vanadyl ascorbate was obtained, the structure of which is expressed by the general formula $VO(OH)(C_6H_7O_6).H_2O$, abbreviated as VO(OH)(Asc).$H_2O$.

For the purpose of describing the invention, the complexes obtained in Examples 1 to 4, were subjected to comprehensive chemical analyses to determine their structures. Due to the repeatedly emphasised analogy between the raw materials used and the method for obtaining titanium and vanadium complexes, which results in the structure of these complexes, for the purposes of this description, an analysis of nuclear magnetic resonance spectra and an infrared analysis for vanadium complex, obtained according to example 5 were cited.

It is obvious to those skilled in the art that nuclear magnetic resonance analysis, will give the necessary information needed to confirm the structure of the vanadium complex, especially because adequate analyses have been provided for titanium analogues of the vanadium complex. Those skilled in the art will also be assured that vanadium complexes, obtained analogously to titanium complexes, will have analogous chemical structures.

Determination of the Structure of Titanium and Ascorbic Acid Complexes

Methods Used

The structure of solid titanium and ascorbic acid complexes, obtained in Examples 1 to 4, was determined by the following spectroscopic methods: nuclear magnetic resonance (NMR), UV-VIS spectroscopy, infrared spectroscopy (IR) and elemental analysis (content of C, H, Ti).

Nuclear magnetic resonance (NMR) spectra were taken on the BRUKER Advance III 600 MHz apparatus in $D_2O$ solution, using the residual solvent signal as a reference. Chemical shift values are given in ppm.

UV-VIS spectra were taken on the double-beam JASCO V-630 apparatus in a water solution with water as a reference.

IR spectra were taken on the Nicolet-NEXUS FT-IR apparatus and KBr (pelleting technique) was used as a carrier.

Determination of hydration water was performed as follows: a complex sample was subjected to drying at 130° C. Drying was carried out until the mass was established. The mass of water was obtained after deducting the mass of the sample from the initial mass.

Elemental analysis of the C, H content of the studied complex was performed using the combustion method by means of the elemental analyser of Super Vario Micro Cube type. The aim was to determine the percentage of C, H in the studied sample.

The determination of the Ti content was performed by means of the ICP-OES iCap 7600 Thermo Scientific spectrophotometer.

$TiO(OH)(C_6H_7O_6).1H_2O$ Complex Obtained According to Example 1

$^1HNMR$ ($D_2O$) σ: 3.72-3.74 (2H, $CH_2$); 4.02-4.03 (1H, CH-OH); 4.67 (1H, CH), wide signal at about 4,7 is residual of $H_2O$.
$^{13}C$-NMR ($D_2O$) σ: 62.4 ($CH_2$); 69.4 (CH); 77.6 (CH); 115.1 and 168.1 (C=C); 175.9 (C=O group).
UV-Vis (c=$10^{-4}$ mole/$dm^3$): λmax=264.0 nm; UV-Vis (c=$10^{-3}$ mole/$dm^3$): λmax=340.0 nm IR: C=O (1717 $cm^{-1}$), C=C (1608 $cm^{-1}$), OH (wide band above 3000 $cm^{-1}$)
Elemental analysis: theoretical: Ti=17.5%; C=27.4%; H=3.6%, experimental: Ti=17.3%, C=27.8%; H=3.4%
Determination of hydration water: about 6.73% (m/m) which indicates that the molecule in its structure contains 1 mole of water per 1 mole of the main component.

$TiO(C_6H_7O_6)_2.2H_2O$ Complex Obtained According to Example 2

$^1HNMR$ ($D_2O$) σ: 3.74-3.75 (2H, $CH_2$); 4.06 (1H, CH); 4.84 (1H, CH), wide signal at about 4,7 is residual of $H_2O$.
$^{13}C$-NMR ($D_2O$) σ: 62.3 ($CH_2$); 69.2 (CH); 76.9 (CH); 116.6 and 161.3 (C=C); 174.5 (C=O group).
UV-Vis (c=$10^{-4}$ mole/$dm^3$): λmax=262.8 nm; UV-Vis (c=$10^{-3}$ mole/$dm^3$): $λ_{max}$=366 nm
IR: C=O (1755, 1733$cm^{-1}$), C=C (1608 $cm^{-1}$)
Elemental analysis: theoretical: Ti=10.6%; C=32.0%; H=4.0%; (m/m), experimental: Ti=10.4%, C=31.5%; H=3.8% (m/m)
Determination of hydration water: about 8.35% (m/m) which indicates that the molecule in its structure contains 2 moles of water per 1 mole of the main component.

$TiO(C_6H_7O_6)_3.3H_2O$ Complex Obtained According to Example 3

$^1HNMR$ ($D_2O$) 3.74-3.75 (2H, $CH_2$); 4.05-4.07 (1H, CH); 4.91 (1H, CH) and wide (cut) signal at about 4.7 is residual of $H_2O$.
$^{13}C$-NMR ($D_2O$) σ: 62.2 ($CH_2$); 69.0 (CH); 76.5 (CH); 117.5 and 157.4 (C=C); 173.7 (CO=O group).
UV-Vis (c=$10^{-4}$ mole/$dm^3$): λmax=261.0 nm; UV-Vis (c=$10^{-3}$ mole/$dm^3$): $λ_{max}$=340-370 nm
IR: C=O (1755 $cm^{-1}$) and bonds C=C (1655 $cm^{-1}$), OH (wide band above 3000 $cm^{-1}$)
Elemental analysis: theoretical: Ti=7.5%; C=33.6%; H=4.2% (m/m), experimental: Ti=7.4%, C=33.4%; H=4.3% (m/m)
Determination of hydration water: about 9.78% (m/m) which indicates that the molecule in its structure contains 3 moles of water per 1 mole of the main component.

$TiO(C_6H_7O_6)_4.5H_2O$ Complex Obtained According to Example 4

$^1HNMR$ ($D_2O$) 3.73-3.74 (2H, $CH_2$); 4.03-4.04 (1H, CH); 4.76 (1H, CH), wide signal at about 4.7 is residual of $H_2O$.
$^{13}C$-NMR ($D_2O$) σ: 62.4 ($CH_2$); 69.3 (CH); 77.3 (CH); 115.8 and 164.5 (C=C); 175.2 (C=O group).
UV-Vis (c=$10^{-4}$ mole/$dm^3$): $λ_{max}$=264.0 nm; UV-Vis (c=$10^{-3}$ mole/$dm^3$): $λ_{max}$=340-370 nm
IR: C=O (1736 $cm^{-1}$), C=C (1624 $cm^{-1}$), OH (wide band above 3000 $cm^{-1}$)
Elemental analysis: theoretical: Ti=5.6%; C=33.7%; H=4.4% (m/m), experimental: Ti=5.5%, C=33.3%; H=4.2% (m/m)
Determination of hydration water: about 10.26% (m/m) which indicates that the molecule in its structure contains 5 moles of water per 1 mole of the main component.

$VO(OH)(C_6H_7O_6).1H_2O$ Complex Obtained According to Example 5

$^1H$-NMR, σ: 3.74-3.75 (2H, $CH_2$); 4.06 (1H, CH);. 4.84 (1H, CH) and wide signal at about 4.5 is residual of $H_2O$ IR: OH (3421 cm$^{-1}$), CH (2923 cm$^{-1}$), C=O (1736 cm$^{-1}$), C=C (1625 cm$^{-1}$), C—H, C—O (1375 cm$^{-1}$, 1163 cm$^{-1}$, 1119 cm$^{-1}$, 1040 cm$^{-1}$, 976 cm$^{-1}$)

EXAMPLE 6

Study of Solution Stability for a Given Complex

As a result of the performed stability study of the complexes according to the invention, it was found that these complexes in the form of solutions have a higher stability than the titanium complexes known in the art. The most stable solution was the complex at a 1:2 ratio of Ti:Asc (TiO(Asc)$_2$.2H$_2$O) and analogously the complex at a 1:2 ratio of V:Asc (VO(Asc)$_2$.2H$_2$O ).

Obtained by dissolving in water, 5% solution of titanyl ascorbate (for a 1:2 molar ratio of Ti:Asc (TiO(Asc)$_2$.2H$_2$O), shows good physicochemical properties, remains stable at a temperature of −5 to +40° C. and is stable during long storage for up to 12 months. After overcooling to a temperature below −7° C., the product completely freezes, and then, after raising the temperature to above 0° C., the product is completely thawed and retains its original physicochemical properties and properties as a stimulator of plant growth.

Due to the above results of the stability study, for the complex of a 1:2 ratio of Ti:Asc (TiO(Asc)$_2$.2H$_2$O), studies on effects on plants were performed. For comparison purposes, studies for other obtained titanium complexes were also performed.

EXAMPLE 7

Method for Obtaining a Titanyl Ascorbate Formulation at a 1:2 Molar Ratio of Ti:Asc (TiO(Asc)$_2$.2H$_2$O) in a Solid Form The obtained solution of titanyl ascorbate at a 1:2 molar ratio of Ti:ascorbic acid from Example 2, was spray dried at the temperature of 250° C. of heating gases at the inlet and 95° C. at the outlet from the dryer. The product was obtained in the form of a powder consisting of: titanium (Ti) 10.4% (m/m); and the structure of TiO(Asc)$_2$.2H$_2$O. In the case of using a spray dryer with a fluidised bed, a solid product was obtained in the form of a microgranulate, characterised by a larger grain size in comparison to the powder, and thus, from the application point of view, by smaller dusting during use. Both forms of the product are dark brown in colour with very good solubility in water. Used in fertiliser mixtures, both liquid and powdery, it stimulates plant growth and improves the efficiency of macro and micronutritional fertilisers used.

This product can be a component of many freely designed loose, granulated and liquid mixtures adapted to current needs, for use in the cultivation of plants (including seed dressing) and animal husbandry.

The obtained ascorbates in a solid form can be combined into any solid blends with other components that may affect the growth of plants that provide them with nutrients or biostimulants. These compounds are listed above.

The use of described ascorbates with the above excipients in solid formulations, broadens greatly the range of their concentrations in the formulation and the number of groups of compounds, that can be placed in such a formulation, which would be impossible in a liquid formulation, due to stability problems (precipitation, limited solubility in water).

EXAMPLE 8

Method for Preparing a Fertilising Formulation in a Loose Form, Containing Titanyl Ascorbate at a 1:2 Molar Ratio of Ti:Asc (TiO(Asc)$_2$.2H$_2$O)

To a mixer equipped with a stirrer and shredders, 113.0 kg of urea ((NH$_2$)$_2$CO) and 522.0 kg of magnesium sulphate (MgSO$_4$) were introduced, the mixer with the shredders run for 4 minutes to break the urea granules. After stopping the mixer, the other components, micronutrient carriers were added: boric acid (H$_3$BO$_3$) 46 kg; copper sulphate (CuSO$_4$) 18.0 kg; zinc sulphate (ZnSO$_4$) 24.0 kg; cobalt chloride (CoCl$_2$) 0.9 kg; ammonium heptamolibdate ((NH$_4$)$_6$Mo$_7$O$_{24}$) 0.4 kg. Then chelates were added in the form of a 2-sodium salt of edetic acid: Cu EDTA with a copper content of 15% in the amount of 35 kg: Zn EDTA with a zinc content of 15% 53.2 kg; Mn EDTA with a manganese content of 13% 92.0 kg: Fe EDTA with an iron content of 13% 92.0 kg. 3.9 kg of loose titanium ascorbate (Ti:ascorbic acid 1:2; iO(Asc)$_2$.2H$_2$O) with a titanium content of 10.4% (m/m) was added to the abovementioned amount of raw materials of micronutrient carriers. The content of the mixer was thoroughly mixed and then confectioned. A loose product was obtained with the following content (m/m): boron (B) 0.8%; copper (Cu) 0.9%; zinc (Zn) 1.64%; manganese (Mn) 1.2%; molybdenum (Mo) 0.02%; cobalt (Co) 0.02%; iron (Fe) 1.2%; nitrogen (N) 5.2%; magnesium (MgO) 12.1%; and titanium (Ti) 0.04%. An exemplary blend of micronutrients is used for the cultivation of corn. Use after dissolving in 250-300 litres of water in the form of foliar spray, twice in amounts of 0.8 to 1.5 kg, depending on the needs in phase BBCH 18-20, i.e. 8 to 10 leaves, and in phase BBCH 22-39 above 12 leaves to 9 nodes.

Example 8 describes the preparation of a loose fertiliser blend with titanyl ascorbate for use in the cultivation of plants after dissolution with water. Those skilled in the art will be able to provide formulations and conditions for obtaining solid formulations based on general knowledge in the art, adapting them to the designed composition of the formulation. The composition of the formulation will depend on the plant in the cultivation of which the formulation will be used.

Analogously, an example is implemented for the vanadium ascorbate complex of V:Asc 1:2 (VO(Asc)$_2$.2H$_2$O). It will be obvious to those skilled in the art that the above and the examples given below for titanium complexes can be carried out analogously to the corresponding vanadium complexes.

EXAMPLE 9

Method for Preparing a Suspended Fertilising Formulation for Seed Dressing, Containing Titanyl Ascorbate at a 1:2 Molar Ratio of Ti:Asc (TiO(Asc)$_2$.2H$_2$O)

To 610 l of water at the temperature of 45° C. in a tank with the stirrer running and the possibility of heating, the following was added: 1.3 kg of ammonium heptamolibdate ((NH$_4$)$_6$Mo$_7$O$_{24}$); 12.0 kg of boric acid (H$_3$BO$_3$); 15.0 kg of manganese chloride (MnCl$_2$); 117.3 kg of a 4-sodium salt of edetic acid; 100.0 kg of magnesium chloride (MgCl$_2$) and 40.0 kg of urea ((NH$_2$)$_2$CO). The whole was stirred for 30 minutes, while maintaining the temperature at 40 to 45° C. until a clear solution was obtained. Then the following was added: 8.0 kg of potassium sulphate (K$_2$SO$_4$); 15.0 kg of zinc sulphate (ZnSO$_4$); 25.0 kg of potassium phosphate ($KH_2PO_4$), 8 kg of fulvic acids and 10 kg of humic acids followed by the addition of 17.3 kg of titanyl ascorbate at a 1:2 molar ratio of Ti:ascorbic acid ($TiO(Asc)_2.2H_2O$) and 160.0 kg of bentonite. The mixture thus obtained was vigorously stirred at the temperature of 45° C. for 480 minutes. A suspended fertiliser for seed dressing of cereal grains and others was obtained which is usually used simultaneously with antifungal dressings. Use in the amount of 200 ml, together with a fungicide as used in the amount indicated on the label. After topping up with water to 1000 ml, use 100 kg of cereal grains for dressing.

Example 9 describes the preparation of a liquid fertiliser blend with solid titanyl ascorbate for use directly in the cultivation of plants by seed dressing.

EXAMPLE 10

Method for Preparing a Fertilising Formulation in a Liquid Form, Containing Titanyl Ascorbate at a 1:2 Molar Ratio of Ti:Asc ($TiO(Asc)_2.2H_2O$)

Into the reactor, 620 litres of water was introduced, 38 kg of potassium hydroxide (KOH) was introduced, followed by the introduction of 90 kg 75% of orthophosphoric acid ($H_3PO_4$) with a small stream. The whole was stirred for 60 minutes. Then, after cooling the solution to the temperature of 20° C., 30 kg 25% of ammonia water ($NH_4OH$) and 105 kg of potassium sulphate ($K_2SO_4$) were introduced, the whole was stirred for 30 minutes. Then chelates were added into the reactor in the form of a 2-sodium salt of edetic acid: Cu EDTA with a copper content of 15% in the amount of 0.8 kg: Zn EDTA with a zinc content of 15% 0.7 kg; Mn EDTA with a manganese content of 13% 0.8 kg: Fe EDTA with an iron content of 13% 1.5 kg, and 2 kg of loose titanium ascorbate (Ti:ascorbic acid 1:2; $iO(Asc)_2.2H_2O$) with a titanium content of 10.4% (m/m) was added. Then, the content of the reactor was heated to the temperature of 45° C., 10 kg of citric acid was added and then, 300 kg of urea was added in small portions.

EXAMPLE 11

Method for Preparing a Formulation with Biostimulating Effect in a Loose Form, Containing Titanyl Ascorbate at a 1:2 Molar Ratio of Ti:Asc ($TiO(Asc)_2.2H_2O$)

To the mixer of solids equipped with a stirrer, the following was introduced: 911.5 kg of protein hydrolyzate (containing 87% of total amino acids and 8% of free amino acids), 30 kg of mannitol, 8 kg of seaweed extract (*Ascophyllum nodosum*). To increase the content of amino acids, 5 kg of glycine, 10 kg of tryptophan were added. Then, 30 kg of Optysil Ultra silicon preparation fully soluble in water with silicon content of Si=20%, 0.5 kg of vitamin B1 and 1 kg of *Bacillus subtilis* lyophilisate ($10^{12}$ CFU) were added.

4 kg of loose titanium ascorbate (Ti:ascorbic acid 1:2; $iO(Asc)_2.2H_2O$) with a titanium content of 10.4% (m/m) was added to the abovementioned amount of raw materials. The content of the mixer was thoroughly mixed and then confectioned.

EXAMPLE 12

Method for Preparing a Solid Fertilising Formulation in the Form of Granules for Soil Application in the Form of Granules, Containing Titanyl Ascorbate at a 1:2 Molar Ratio of Ti: Asc ($TiO(Asc)_2.2H_2O$)

Compacting:

To a compactor container equipped with a mixing system, the following was introduced: 166.6 kg of ammonium sulphate, 50 kg of diammonium phosphate, 200 kg of phosphorites, 213 kg of potassium sulphate, 54 kg of potassium chloride, 150 kg of raw magnesite, 160 kg of magnesium sulphate monohydrate, 1.4 kg of iron sulphate monohydrate, 0.85 kg of copper sulphate, 1.36 kg of manganese sulphate, 1.6 kg of boric acid, 1 kg of zinc sulphate monohydrate, 0.17 kg of a mixture containing 45% of molybdenum. 3.9 kg of loose titanium ascorbate (Ti:ascorbic acid 1:2; $TiO(Asc)_2.2H_2O$) with a titanium content of 10.4% (m/m) was added to the abovementioned amount of raw materials. The content of the mixer was thoroughly mixed and then confectioned.

After thorough mixing of components, the whole container has been subjected to crushing, followed by grinding and sieving through sieves. The granulate thus obtained was subjected to confection.

Granulation:

The following raw materials were introduced into the mixer: 460 kg of urea, 133.3 kg of diammonium phosphate, 300 kg of potassium sulphate, 10 kg of magnesite, 0.57 kg of boric acid, 0.08 kg of cobalt sulphate, 0.42 kg of copper sulphate, 17 kg of iron sulphate monohydrate, 3.25 kg of manganese sulphate, 0.35 kg of molybdenum raw material, 0.3 kg of zinc sulphate monohydrate. 3.9 kg of loose titanium ascorbate (Ti:ascorbic acid 1:2; $TiO(Asc)_2.2H_2O$) with a titanium content of 10.4% (m/m) was added to the abovementioned amount of raw materials.

After thorough mixing of components, the product is transported to a disc granulator.

700 litres of water and 500 kg of magnesium sulphate heptahydrate were introduced to the reactor with a stirrer. After clarification, the solution was transported to the granulator.

The loose mixture was dosed on the rotating disc which was sprayed with a previously prepared solution of magnesium sulphate. The granules produced were transferred to the conveyor belt and fed into a drum in which hot air flows over the granules. The so dried granulate was sieved and confectioned.

Use of the Complexes According to the Invention—Limitations on the Occurrence of Pests and/or Pathogens The experiments on the effect of the formulations according to the invention (liquid preparation obtained after dissolving the solid blend, according to the invention) were performed on winter oilseed rape, winter wheat and corn plants at the Institute of Plant Protection in Poznan at the Experimental Station in Winna Góra.

The preparations used in Examples 13-23 are solid formulations for preparing working solutions, seed dressing suspensions, solid granules for soil application and liquid formulations obtained by dissolving, in water, a solid stable formulation of an appropriate ascorbate complex with other components.

EXAMPLE 13

Use of Titanyl Ascorbate at a 1:2 Molar Ratio of Ti:Asc ($TiO(Asc)_2.2H_2O$) in the Formulation Used in the Cultivation of Winter Oilseed Rape—Effects on Plant Development and Limitations on the Occurrence of Pests and/or Pathogens The experiment with winter oilseed rape of Artoga type has shown a beneficial effect of titanyl ascorbate used ($TiO(Asc)_2.2H_2$) on the increase in yield and reduction of plant damage by pests and infestations by pathogens. The preparation was applied in a foliar manner in a dose of 32.6 g TiO(Asc)$_2$.2H$_2$O/ha in development stages of rape expressed on the international scale of BBCH on the following dates: I—BBCH 21-36, II—BBCH 50-61, III—BBCH 69-73. Rape yield increased compared to the control combination by 15%. Infestation of siliques by *Alternaria brassicae* was smaller than the control combination by 52%. Infestation of siliques by *Botrytis cinerea* was smaller than the control combination by 77%. Siliques damaged by cabbage seed weevil were fewer than in the control combination by 80%.

EXAMPLE 14

Use of Titanyl Ascorbate at a 1:2 Molar Ratio of Ti:Asc (TiO(Asc)$_2$.2H$_2$O) in the Formulation Used in the Cultivation of Corn of Wilga Type—Effects on Plant Development and Limitations on the Occurrence of Pests and/or Pathogens The experiment on corn of Wilga type showed a beneficial effect of the preparation applied in a foliar manner on the yield amount and on the reduction of plant damage (plant biting) by corn borer moth. The preparation was applied in a dose of 32.6 g TiO(Asc)$_2$.2H$_2$O/ha in development stages of corn expressed on the international scale of BBCH on the following dates: I—BBCH 12-14, II—BBCH 18-20, III—BBCH 35-39. Corn yield increased compared to the control combination by 13% (m/m). A 43% decrease in the infestation by corn borer moth was noted in comparison to plants not treated with the preparation containing organic titanium complexes.

EXAMPLE 15

Use of Titanyl Ascorbate at a 1:2 Molar Ratio of Ti:Asc (TiO(Asc)$_2$.2H$_2$O) in the Formulation Used in the Cultivation of Wheat of Figura Type—Effects on Plant Development and Limitations on the Occurrence of Pests and/or Pathogens The experiment on wheat of Figura type has demonstrated the beneficial effect of the applied foliar preparation on the yield size and on the reduction of plant damage by pests and infestations by pathogens. The preparation was applied in a dose of 32.6 g TiO(Asc)$_2$.2H$_2$O/ha in development stages of wheat expressed on the international scale of BBCH on the following dates: I—BBCH 22-29, II—BBCH 30-51, III—BBCH 51-73. Wheat yield increased compared to the control combination by 16% (m/m).

Furthermore, a 74% decrease in the infestation by cereal leaf beetle was noted in comparison to plants not treated with the preparation containing organic titanium complexes. On plants treated with titanyl ascorbate, infestation through the fragility of stem base was 4%, while on the control combination there were 48% of infested plants. There were not any symptoms of fusarium foot and root rot on the sprayed plants, while on control plants (control group) 12% of infestations were found.

In the case of diseases attacking spikes, on the control combination, infestation by *Cladosporium herbarum* at 20%, by *Septoria nodorum* at 10% and by *Gibberella avenacea* at 10% were found. On sprayed plants, infestations were 1%, 1% and 0% respectively.

Practical attempts to use titanium ascorbate in the cultivation of plants, at a 1:2 molar ratio of Ti: Asc (TiO(Asc)$_2$.2H$_2$O), prepared by the method according to the invention—confirmed its good effectiveness when used on plants as well as stability, both during storage and during the preparation of any fertilising solutions and blends such as the formulations according to the invention and/or the reduction of occurrence of pathogens and pests, in a liquid or loose form.

EXAMPLE 16

Use of Vanadyl Ascorbate at a 1:2 Molar Ratio of V:Asc (VO(Asc)$_2$.2H$_2$O) in the Cultivation of Wheat of Figura Type—Effects on Plant Development and Limitations on the Occurrence of Pests and/or Pathogens The experiment was performed analogously to the titanium complex at a 1:2 molar ratio of Ti:ascorbic acid (TiO(Asc)$_2$.2H$_2$O). Initial studies have clearly demonstrated the positive effect of the vanadium complex, according to the invention on the elimination of symptoms, caused by fusarium foot and root rot as well as diseases affecting the plant spikes. Pathogenic symptoms have been significantly reduced, similarly to the use of titanium complexes.

Practical attempts to use vanadyl ascorbate in the cultivation of plants, at a 1:2 molar ratio of V:Asc (VO(Asc)$_2$.2H$_2$O), prepared by the method according to the invention—confirmed its good effectiveness when used on plants as well as stability, both during storage and during the preparation of any solutions and blends that fertilise and/or reduce the occurrence of pathogens and pests, in a liquid or loose form.

Use of the Complexes According to the Invention—Biostimulation

EXAMPLE 17

Use of Titanyl Ascorbates in the Cultivation of Butterhead Lettuce—the Effect on the Uptake of Nutrients TiO(OH)(C$_6$H$_7$O$_6$).1H$_2$O was used in the amount of 9.7 g/ha (0.005%, 0.0085% Ti), (TiO(C$_6$H$_7$O$_6$)$_2$.2H$_2$O) was used in the amount of 16.3 g/ha (0.008%, 0.0085% Ti), TiO(C$_6$H$_7$O$_6$)$_3$.3H$_2$O was used in the amount of 22.9 g/ha (0.011%, 0.0085% Ti), TiO(C$_6$H$_7$O$_6$)$_4$.5H$_2$O was used in the amount of 30.9 g/ha (0.015%, 0.0085% Ti) in a single spray after previously dissolving them in 200 l of water. The spraying was performed with a manual sprayer at the smallest possible drop setting. Plants were sprayed evenly from a distance of about 30 cm.

Substrate: a mixture of peat deacidified with chalk (producer: Hollas) and rinsed quartz sand with a granulation of 4-8 mm. Volume ratio of the mixture: 1:4. Agrofoska (Intermag) fertiliser in the amount of 3 kg/m$^3$ was added to the substrate. Pots with a volume of about 3 l were used.

Spraying was performed twice with the preparation with the same concentrations of working liquid: spray 1 on the 7th day of the experiment; spray 2 on the 14th day of the experiment.

The experiment was randomised and there were 10 repetitions for each combination (1 repetition=one pot)

As an embodiment, measurement was made on the 20th day of the experiment—the table shows averages for selected parameters and selected best prototypes.

The content of nutrients was tested in the aboveground parts of plants, based on dry mass content.

TABLE 1

Effect of titanyl ascorbate in solid formulation on the uptake of nutrients in the cultivation of butterhead lettuce.

| Parameter (mg/kg of dry mass) | CONTROL | $TiO(C_6H_7O_6)_2 \cdot 2H_2O$ | $TiO(C_6H_7O_6)_3 \cdot 3H_2O$ |
| --- | --- | --- | --- |
| Cu content (mg/kg) | 6.92 | 7.13 | 5.46 |
| Mg content (g/kg) | 5.61 | 6.66 | 6.03 |
| Ca content (g/kg) | 14.56 | 17.41 | 17.84 |
| Fe content (mg/kg) | 589.17 | 794.44 | 842.63 |
| Zn content (mg/kg) | 152.96 | 154.18 | 155.38 |
| Mn content (mg/kg) | 542.22 | 687.51 | 757.37 |
| Ti content (mg/kg) | 1.96 | 4.27 | 2.37 |
| B content (mg/kg) | 71.12 | 83.31 | 72.35 |
| Si content (mg/kg) | 238.43 | 231.31 | 257.62 |
| K content (g/kg) | 6.73 | 7.48 | 6.97 |
| S content (g/kg) | 7.10 | 7.41 | 69.78 |

EXAMPLE 18

Use of Titanyl Ascorbates in the Cultivation of Rape—the Effect on Increasing Vegetative Mass and on the Uptake of Nutrients Experiments for the use of titanium complex for rape were performed analogously to Example 14. As an embodiment, measurement was made on the 20th day of the experiment—the table shows averages for selected features and selected best prototypes.

The content of nutrients was tested in the aboveground parts of plants, based on dry mass content.

TABLE 2

Effect of titanyl ascorbate in solid formulation on the uptake of nutrients and on the development of rape.

| Parameter | CONTROL | $TiO(OH)(C_6H_7O_6) \cdot 1H_2O$ | $TiO(C_6H_7O_6)_3 \cdot 3H_2O$ |
| --- | --- | --- | --- |
| Number of plant leaves | 7.22 | 8.28 | 7.94 |
| Wet mass of leaves (g) | 13.52 | 19.00 | 17.74 |
| Wet mass of stem (g) | 18.43 | 21.53 | 21.58 |
| Total wet mass of the aboveground part | 32.49 | 38.3 | 39.61 |
| Mg content (g/kg) | 8.24327 | 8.85859 | 7.85965 |
| Fe content (mg/kg) | 1651.23 | 1957.19 | 1739.07 |
| Mn content (mg/kg) | 1167.95 | 1350.53 | 1440.47 |
| Zn content (mg/kg) | 391.34 | 362.63 | 413.68 |
| Ti content (mg/kg) | 0.56 | 1.55 | 1.07 |
| P content (g/kg) | 9.13 | 8.74 | 11.43 |
| Si content (mg/kg) | 113.75 | 118.21 | 159.40 |

EXAMPLE 19

Use of Titanyl Ascorbates in Solid Formulation $TiO(Asc)_2 \cdot 2H_2O$ in the Vultivation of Wheat—the Effect on Chlorophyll Synthesis in Plant and on the Uptake of Nutrients Experiments for the use of titanium complex in the solid formulation $TiO(Asc)_2 \cdot 2H_2O$ on wheat were performed analogously to Example 14. As an embodiment, measurement was made on the 20th day of the experiment—the table shows averages for selected features and selected best prototypes.

The content of nutrients was tested in the aboveground parts of plants, based on dry mass content.

TABLE 3

Effect of titanyl titorbate on the uptake of nutrients and on chlorophyll content in the cultivation of wheat

| Parameter | CONTROL | TiO(OH)(C$_6$H$_7$O$_6$)•1H$_2$O | TiO(C$_6$H$_7$O$_6$)$_2$•2H$_2$O | TiO(C$_6$H$_7$O$_6$)$_3$•3H$_2$O | TiO(C$_6$H$_7$O$_6$)$_4$•5H$_2$O |
|---|---|---|---|---|---|
| Content of chlorophyll in leaves (SPAD) | 44.08 | 47.17 | 48.03 | 45.60 | 47.06 |
| Fe content (mg/kg) | 95.511 | 96.280 | 85.056 | 97.390 | 100.910 |
| Zn content (mg/kg) | 44.320 | 47.880 | 48.850 | 51.410 | 44.290 |
| Ti content (mg/kg) | 0.662 | 1.444 | 1.390 | 1.311 | 1.150 |
| P content (g/kg) | 9.47 | 9.86 | 10.43 | 9.47 | 10.09 |
| K content (g/kg) | 53.86 | 57.21 | 55.27 | 57.22 | 53.29 |

EXAMPLE 20

Use of Titanyl Ascorbates in the Formulation in the Cultivation of Iceberg Lettuce—the Effect on Increasing the Vegetative Mass, the Synthesis of Chlorophyll and the Content of Flavonoids Iceberg cabbage lettuce (*Lactuca sativa*) of Rubette type was cultivated in a plastic tunnel in pots with a capacity of 3 l filled with a peat substrate. Titanil ascorbate at a 1:2 molar ratio of Ti: Asc (TiO(C$_6$H$_7$O$_6$)$_2$.2H$_2$O) and liquid titanil ascorbate at a 1.5:1 molar ratio of (obtained in situ—according to the method of patent specification PL 163688 or PL 214628) were applied in a foliar manner twice during the entire cultivation, the concentration of titanium in the working liquid for both formulations was 0.00085% Ti. In two applications, the total titanium dose per hectare was 3.4 g Ti/ha. The experiment was performed in a random block system, combinations were drawn in 4 blocks. There were 20 lettuce plants for each combination.

Foliar application of the solid formulation TiO(C$_6$H$_7$O$_6$)$_2$.2H$_2$O, compared to the application of titanyl ascorbate obtained in situ (as well as compared to plants from the control object) increased the mass of a single head of lettuce and the content of chlorophyll. At the same time, the use of a solid formulation resulted in higher levels of accumulated flavonoids. Flavonoids are antioxidant compounds, they protect plant cell structures against reactive oxygen species formed under the influence of abiotic and biotic stress factors. These compounds are the first to be synthesised when unfavourable conditions of the growing environment occur. Increasing the synthesis of these compounds under the influence of application of a solid formulation (TiO(C$_6$H$_7$O$_6$)$_2$.2H$_2$O), compared to a liquid formulation, indicates that titanyl ascorbate (TiO(C$_6$H$_7$O$_6$)$_2$.2H$_2$O) increases the antioxidant capacity of plants, and thus increases the resistance of plants to unfavourable growing conditions, i.e. abiotic stresses such as drought.

TABLE 4

Mass of lettuce head, content of chlorophyll, flavonoids, in lettuce plants treated with TiO(Asc)$_2$•2H$_2$O treated with titanium compounds.

| Parameters | Control | TiO(C$_6$H$_7$O$_6$)$_2$•2H$_2$O | Liquid formulation (complex prepared in-situ) |
|---|---|---|---|
| Mass of head (g) | 68.4 | 82.8 | 80.0 |
| Dry mass (g) | 7.22 | 7.23 | 6.83 |
| Chlorophyll (µg/cm$^2$) | 23.7 | 27.4 | 26.4 |
| Flavonoids (µg/cm$^2$) | 0.25 | 0.32 | 0.23 |

Example 20 illustrates the more effective operation of a solid formulation over a liquid formulation known in the art.

EXAMPLE 21

Use of Vanadyl Ascorbate at a 1:2 Molar Ratio of V:Asc (VO(C$_6$H$_7$O$_6$)$_2$.2H$_2$O) in a Solid Formulation in the Cultivation of Iceberg Lettuce—the Effect on Vegetative Mass Increase, Chlorophyll Synthesis, Flavonoid Content and Uptake of Nutrients The experiment was performed analogously to the titanium complex at a 1:2 or 1.5:1 (Example 20) molar ratio of Ti:ascorbic acid. VO(C$_6$H$_7$O$_6$)$_2$.2H$_2$O was used in the form of foliar spraying twice, vanadium concentration in the working liquid was 0.001% V. In two applications, the total micronutrient dose per hectare was 10 g V/ha.

The presented study results indicate a beneficial effect of VO(C$_6$H$_7$O$_6$)$_2$.2H$_2$O on the growth and development of lettuce plants. Foliar application of VO(C$_6$H$_7$O$_6$)$_2$.2H$_2$O increased the mass of the lettuce head by 14% compared to the control. Furthermore, vanadium ascorbate at a 1:2 molar ratio of V:Asc increased the chlorophyll content. Also, differences were found in the level of flavonoid accumulation between the control object and the combination treated with VO(C$_6$H$_7$O$_6$)$_2$.2H$_2$O.

TABLE 6

Mass of lettuce head, content of chlorophyll, flavonoids, in lettuce plants treated with VO(C$_6$H$_7$O$_6$)$_2$•2H$_2$O.

| Parameters | Control | VO(C$_6$H$_7$O$_6$)$_2$•2H$_2$O |
|---|---|---|
| Mass of lettuce head (g) | 68.4 | 78.2 |
| Dry mass (%) | 7.22 | 6.85 |
| Chlorophyll (µg/cm$^2$) | 23.7 | 29.6 |
| Flavonoids (µg/cm$^2$) | 0.25 | 0.29 |

Lettuce plants treated with vanadyl ascorbate in terms of macronutrient content were better nourished than control plants.

TABLE 7

Macronutrient content in lettuce

| Parameters (g/kg d.c.) | Control | VO(C$_6$H$_7$O$_6$)$_2$•2H$_2$O |
|---|---|---|
| P content (g/kg) | 3.32 | 3.42 |
| K content (g/kg) | 20.69 | 21.84 |
| Ca content (g/kg) | 17.04 | 18.17 |
| Mg content (g/kg) | 4.76 | 4.92 |
| S content (g/kg) | 2.44 | 2.69 |

EXAMPLE 22

Use of Vanadyl Ascorbate at a 1:2 Molar Ratio of V:Asc (VO(C$_6$H$_7$O$_6$)$_2$.2H$_2$O) in a Solid Formulation in the Cultivation of Celery—the Effect on Vegetative Mass Increase, Chlorophyll Synthesis and Flavonoid Content Cultivation of celery (*Apium graveolens*) was carried out in a plastic tunnel in pots with a capacity of 3 l filled with peat substrate. Vanadyl ascorbate at a 1:2 molar ratio of V:Asc (VO(C$_6$H$_7$O$_6$)$_2$.2H$_2$O) was applied three times during the entire cultivation in BBCH phases: 4-16 (4-6 leaves), 19-40 (10 and more leaves) and 42-44 (root development) in the form of fine-droplet spraying. Two vanadium doses of 5 g V/ha (0.001%) and 10 g V/ha (0.002%) were used. The experiment was performed in a random block system, combinations were drawn in 4 blocks. There were 20 celery plants for each combination.

The mass of celery leaves has been increased both by the application of vanadium in the amount of 5 g and 10 g/ha. In the case of root mass, a larger biostimulatory effect was observed for a dose of 5 g V/ha than 10 g V/ha. For a smaller dose, root mass has increased by 23%, while for a dose of 10 g V/ha by 11% compared to plants from the control object. A dose of 5 g V/ha positively influenced the quality parameters of celery, the dry mass of leaves, the content of chlorophyll and flavonoids have increased. However, a dose of 10 g V/ha contributed to the increase in dry mass of leaves and to the increase in content of flavonoids. The results of this experiment indicate a biostimulatory effect of low doses of vanadium on the utility yield increase of vegetable plants and its qualitative parameters.

TABLE 8

Mass of vegetative part, content of chlorophyll, flavonoids, in celery plants treated with VO(C$_6$H$_7$O$_6$)$_2$•2H$_2$O in a dose of 5 g V/ha.

| Parameters | Control | VO(C$_6$H$_7$O$_6$)$_2$•2H$_2$O |
|---|---|---|
| Mass of celery leaves (g) | 302.9 | 320.3 |
| Dry mass of leaves (%) | 8.4 | 8.9 |
| Mass of celery root (g) | 70.2 | 90.7 |
| Dry mass of root (%) | 3.0 | 2.9 |
| Chlorophyll (µg/cm$^2$) | 33.2 | 35.0 |
| Flavonoids (µg/cm$^2$) | 0.69 | 0.77 |

TABLE 9

Mass of vegetative part, content of chlorophyll, flavonoids, in celery plants treated with VO(C$_6$H$_7$O$_6$)$_2$•2H$_2$O in a dose of 10 g V/ha.

| Parameters | Control | VO(C$_6$H$_7$O$_6$)$_2$•2H$_2$O |
|---|---|---|
| Mass of celery leaves (g) | 302.9 | 317.3 |
| Dry mass of leaves (%) | 8.4 | 9.5 |
| Mass of celery root (g) | 70.2 | 78.5 |
| Dry mass of root (%) | 3.0 | 3.1 |
| Chlorophyll (µg/cm$^2$) | 33.2 | 32.0 |
| Flavonoids (µg/cm$^2$) | 0.69 | 0.72 |

EXAMPLE 23

Use of Vanadyl Ascorbate at a 1:2 Molar Ratio of V:Asc (VO(C$_6$H$_7$O$_6$)$_2$.2H$_2$O) in the Cultivation of Radish—the Effect on Vegetative Mass Increase, Chlorophyll Synthesis and Flavonoid Content Radish (*Raphanus sativus*) of Ronda type was cultivated in a plastic tunnel in a peat substrate. Vanadyl ascorbate at a 1:2 molar ratio of V:Asc (VO(C$_6$H$_7$O$_6$)$_2$.2H$_2$O) was applied in the form of foliar spraying twice during the entire cultivation, vanadium concentration in the working liquid was 0.004% V. In two applications, the total vanadium dose per hectare was 20 g V/ha. The experiment was performed in a random block system, combinations were drawn in 4 blocks. There were 20 plants for each combination.

Foliar application of vanadyl ascorbate VO(C$_6$H$_7$O$_6$)$_2$.2H$_2$O has increased the mass of radish root by 12% compared to the control plants. It has also slightly increased the dry mass content of the root and chlorophyll in the leaves. Furthermore, in vanadium treated plants, the content of flavonoids responsible for protecting plant cells from oxidative stress, which is caused, among others, by through drought, has increased almost twice as compared to the control.

TABLE 10

Mass of root, content of chlorophyll, flavonoids, in radish plants treated with VO(C$_6$H$_7$O$_6$)$_2$•2H$_2$O in a dose of 20 g V/ha.

| Parameters | Control | VO(C$_6$H$_7$O$_6$)$_2$•2H$_2$O |
|---|---|---|
| Mass of radish root (g) | 17.1 | 19.5 |
| Dry mass of root (%) | 4.7 | 4.8 |
| Chlorophyll (µg/cm$^2$) | 19.0 | 19.1 |
| Flavonoids (µg/cm$^2$) | 0.48 | 0.88 |

The invention claimed is:

1. A method of cultivating plants and reducing the occurrence of plant pests and pathogens comprising a step of administering a formulation to soil, leaves, through fertigation or as an addition to seed dressing, to reduce an occurrence of plant pests and pathogens, wherein the pests are selected from the group consisting of cabbage seed weevil, corn borer moth, and cereal leaf beetle;

wherein the formulation comprises titanium complexes and one or more agriculturally acceptable substances selected from the group consisting of excipients, carriers, and other active agents, wherein said titanium complexes consist essentially of titanium and ascorbic acid complexes of formula TiO(H)$_z$(Asc)$_x$.yH$_2$O, wherein:

Asc is an ascorbate moiety of molecular formula —C$_6$H$_7$O$_6$;

x is an integer from 1 to 4, y is an integer from 0 to 5; z is 0 or 1; and a molar ratio of Ti to Asc is from 1:1 to 1:4, wherein the titanium complexes are present in the formulation in an amount of 0.2 wt. % to 99 wt. %, based on a total weight of the formulation, said formulation excludes titanium citrate ascorbate complexes, and said formulation is administered in a form selected from the group consisting of a liquid product dissolved in water and a solid product.

2. The method according to claim 1, characterized in that the formulation is administered in the form of the solid product.

3. The method according to claim 1, characterized in that the plants are selected from the group consisting of cereals, vegetables, fruits, ornamental plants, and grasses.

4. The method according to claim 1, characterized in that the plants are selected from the group consisting of: wheat, rape, and lettuce.

5. The method according to claim 1, charactetized in that the method provides at least one biostimulation effect selected from the group consisting of increasing the photosynthesis activity, increasing the enzyme activity to stimulate uptake of nutrients, increasing pollen vitality, activation of pollination and fertilization processes, increasing yield and assimilation of micronutrients, increasing resistance to biotic and abiotic stresses, and stimulation of plants to synthesize more flavonoids.

6. The method according to claim 1, charactetized in that the formulation is administered in combination with other mixtures used in the cultivation of plants.

7. The method according to claim 1, characterized in that the formulation is dissolved in water and administered as a liquid formulation.

8. A method of cultivating plants and reducing the occurrence of plant pests and pathogens comprising a step of administering a formulation to soil, leaves, through fertigation or as an addition to seed dressing, to reduce an occurrence of plant pests and pathogens, wherein the pests are selected from the group consisting of cabbage seed weevil, corn borer moth, and cereal leaf beetle;

wherein the formulation comprises vanadium complexes and one or more agriculturally acceptable substances selected from the group consisting of excipients, carriers, and other active agents, wherein said vanadium complexes consist essentially of vanadium and ascorbic acid complexes of formula $VO(OH)_z(Asc)_x \cdot yH_2O$, wherein:

Asc is an ascorbate moiety of molecular formula $-C_6H_7O_6$;

x is an integer from 1 to 4;

y is an integer from 0 to 5; z is 0 or 1; and a molar ratio of V to Asc is from 1:1 to 1:4, wherein the vanadium complexes are present in an amount of 0.2 wt. % to 99 z Ft. %, based on a. total weight of the formulation, and said formulation is administered in a form selected from the group consisting of a liquid product dissolved in water and a solid product.

9. The method according to claim 8, characterized in that the method provides at least one biostimulation effect selected from the group consisting of increasing the photosynthesis activity, increasing the enzyme activity to stimulate uptake of nutrients, increasing pollen vitality, activation of pollination and fertilization processes, increasing yield and assimilation of micronutrients, increasing resistance to biotic and abiotic stresses, and stimulation of plants to synthesize more flavonoids.

10. The method according to claim 8, characterized in that the plants are selected from the group consisting of cereals, vegetables, fruits, ornamental plants, and grasses.

11. The method according to claim 8, characterized in that the plants are selected from the group consisting of: wheat, rape, and lettuce.

* * * * *